United States Patent [19]
Taylor et al.

[11] Patent Number: 5,153,862
[45] Date of Patent: Oct. 6, 1992

[54] CASSETTE FOR STORING, MOVING AND LOADING OPTICAL STORAGE DISK CARTRIDGES

[75] Inventors: Wilhelm Taylor; Michael D. Faucett; Daniel J. Woodruff, all of Colorado Springs, Colo.

[73] Assignee: North American Philips Corporation, New York, N.Y.

[21] Appl. No.: 432,914

[22] Filed: Nov. 6, 1989

[51] Int. Cl.$^5$ .................... G11B 17/22; G11B 15/68
[52] U.S. Cl. ........................... 369/36; 360/92; 414/331
[58] Field of Search .............. 369/34, 35, 36, 38, 369/39; 221/79, 80; 414/331, 286, 416, 417; 211/1.5; 360/92

[56] References Cited

U.S. PATENT DOCUMENTS

| | | | |
|---|---|---|---|
| 3,100,090 | 8/1963 | Goodell et al. | 242/55.13 |
| 3,317,212 | 5/1967 | Tatter et al. | 274/11 |
| 3,377,917 | 4/1968 | Mulch | 88/28 |
| 3,501,153 | 3/1970 | Osborne et al. | 274/10 |
| 3,650,413 | 3/1972 | Weigel | 274/4 F |
| 3,658,193 | 4/1972 | Gross | 214/6 D |
| 3,682,483 | 8/1972 | White | 274/4 F |
| 3,722,892 | 3/1973 | Haake | 274/4 F |
| 3,749,410 | 7/1973 | Britz | 274/4 F |
| 3,756,608 | 9/1973 | O'Neill et al. | 274/4 F |
| 3,852,819 | 12/1974 | Staar | 360/92 |
| 3,879,758 | 4/1975 | Pyles | 360/92 |
| 4,071,857 | 1/1978 | Whitney et al. | 360/92 |
| 4,072,991 | 2/1978 | Kok | 360/92 |
| 4,092,679 | 5/1978 | Sander | 360/92 X |
| 4,170,030 | 10/1979 | Castrodale et al. | 369/38 X |
| 4,185,376 | 1/1980 | Johnstone | 29/568 |
| 4,240,120 | 12/1980 | Padwa | 360/15 |
| 4,271,489 | 6/1981 | Siryj et al. | 369/38 |
| 4,286,790 | 9/1981 | Siryj et al. | 369/36 |
| 4,381,527 | 4/1983 | Titus et al. | 360/92 |
| 4,384,310 | 5/1983 | Schatteman et al. | 360/92 |
| 4,504,936 | 3/1985 | Faber et al. | 360/34 |
| 4,519,055 | 5/1985 | Gilson | 360/37 |
| 4,558,983 | 12/1985 | Freeman et al. | 414/331 |
| 4,589,101 | 5/1986 | Schatteman et al. | 369/38 |
| 4,594,042 | 6/1986 | Hoffman | 360/92 X |
| 4,636,888 | 1/1987 | Sidebottom | 360/92 |
| 4,653,037 | 3/1987 | Nakayama et al. | 369/38 |
| 4,668,150 | 5/1987 | Blumberg | 360/92 X |
| 4,682,313 | 7/1987 | Miyake | 369/39 |
| 4,695,990 | 9/1987 | Kawakami | 369/36 X |
| 4,701,899 | 10/1987 | d'Alayer de Costemor d'Arc | 369/36 |
| 4,701,900 | 10/1987 | Hasegawa et al. | 369/39 X |
| 4,730,292 | 3/1988 | Hasegawa et al. | 369/39 |
| 4,737,945 | 4/1988 | Yamazaki et al. | 369/36 |
| 4,791,626 | 12/1988 | Staar | 369/37 |
| 4,797,865 | 1/1989 | Imai et al. | 369/36 |
| 4,807,208 | 2/1989 | Geiger | 369/39 |
| 4,815,055 | 3/1989 | Fago, Jr. | 369/36 |
| 4,817,070 | 3/1989 | Hug et al. | 369/36 |
| 4,817,071 | 3/1989 | Carlson et al. | 369/36 |
| 4,932,828 | 6/1990 | Katae et al. | 414/331 X |
| 4,949,324 | 8/1990 | Arata | 369/36 |
| 4,979,862 | 12/1990 | Bartlett et al. | 414/331 |

OTHER PUBLICATIONS

"Compact Disc Changer CDC 486," by Philips.

Primary Examiner—John W. Shepperd
Assistant Examiner—Michael C. Kessell
Attorney, Agent, or Firm—David R. Treacy

[57] ABSTRACT

A mass loader stores a plurality of cartridges for loading a selected one of the cartridges into an optical disk reader. The loader comprises a magazine carrier and a cartridge loading apparatus. The cartridges are stored in a vertical and parallel orientation within slots in a magazine which is then inserted into the magazine carrier. The magazine carrier depends from a follower nut which travels along a lead screw in a direction transverse to the parallel orientation of the cartridges. As the leadscrew turns, the follower nut travels therealong to move the magazine into the correct position to load the selected one of the cartridges into the reader. After the magazine is properly positioned, another lead screw is driven to propel another follower nut therealong. The follower nut has a loading pin protruding therefrom which engages the selected one of the cartridges for loading. The leadscrew is then driven to propel the cartridge via the pin on the follower nut into the reader.

7 Claims, 6 Drawing Sheets

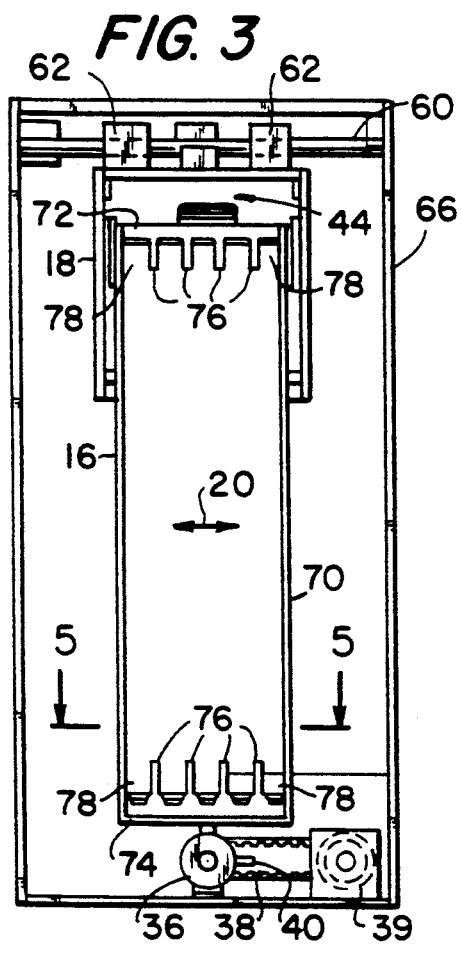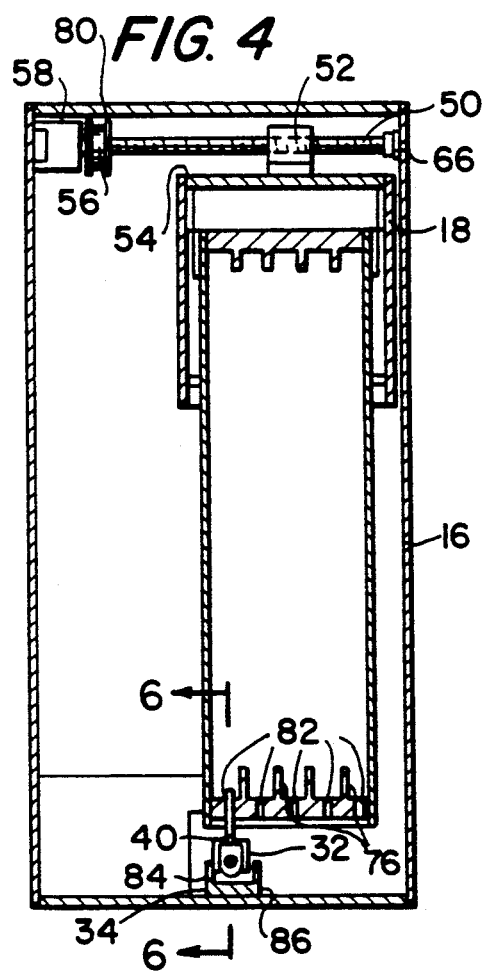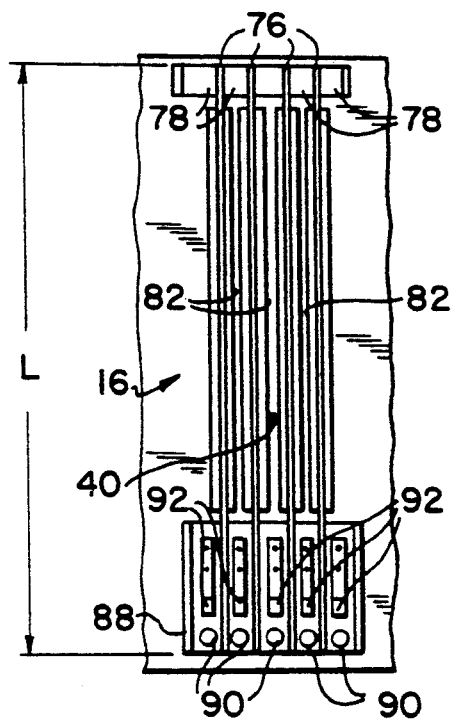

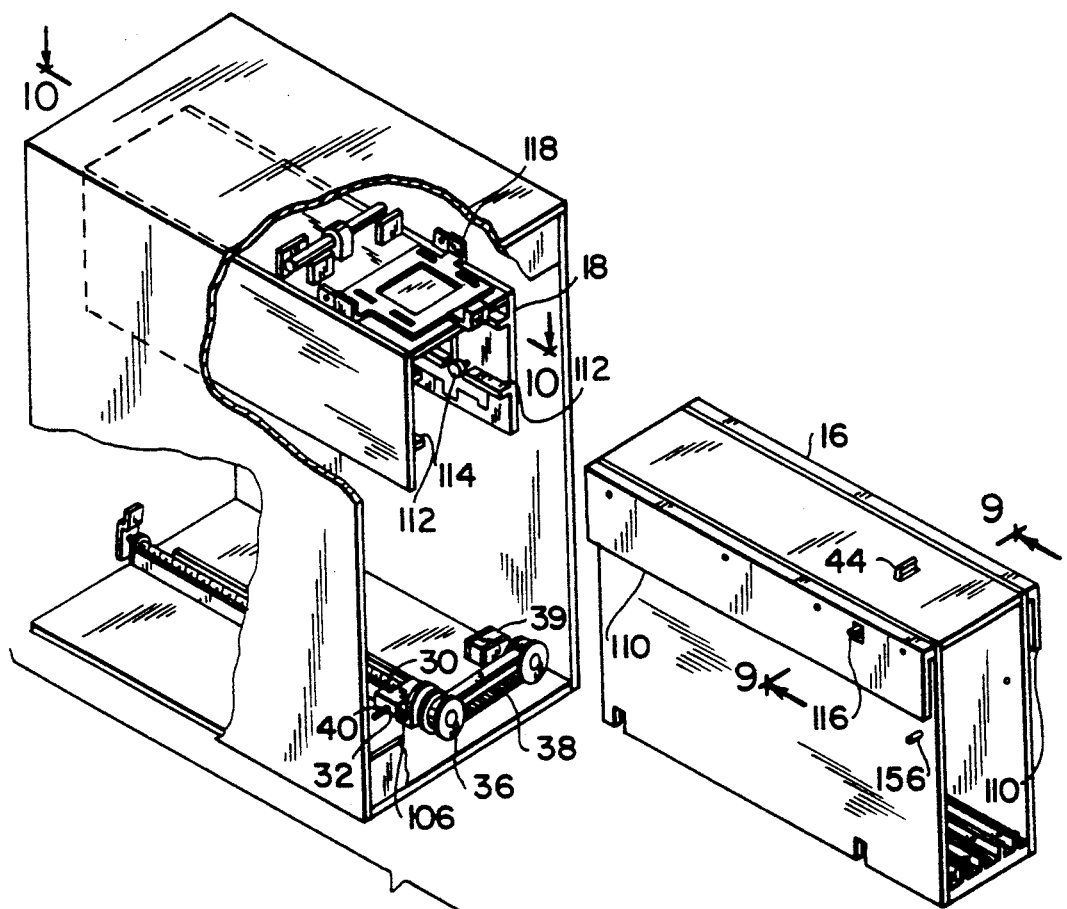
FIG. 8
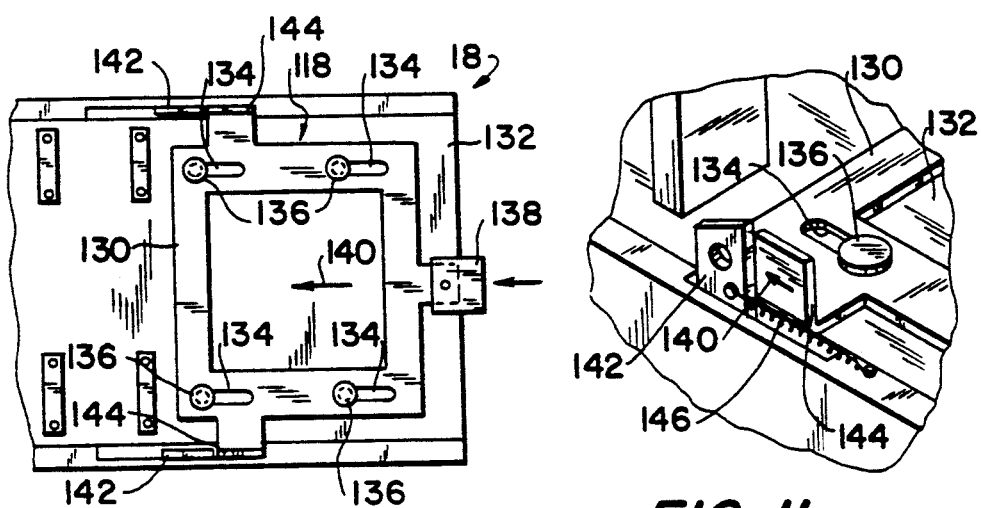
FIG. 10
FIG. 11

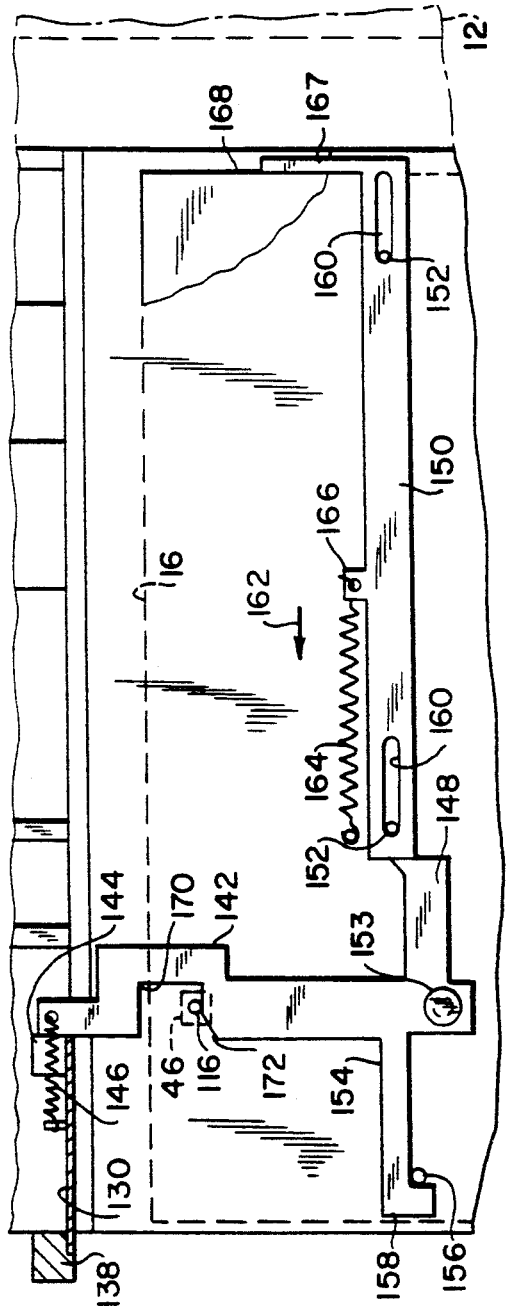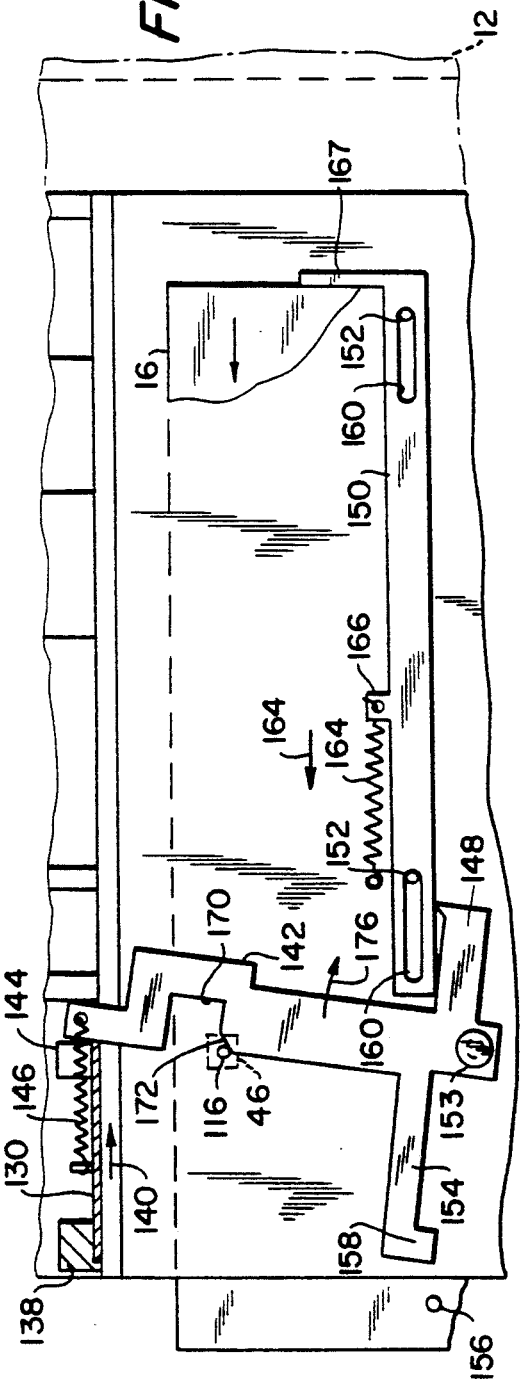

CASSETTE FOR STORING, MOVING AND LOADING OPTICAL STORAGE DISK CARTRIDGES

TECHNICAL FIELD OF THE INVENTION

This invention relates in general to optical storage disk devices, and in particular to an apparatus for storing, moving and loading a plurality of optical storage disks and method.

BACKGROUND OF THE INVENTION

Electronic data storage devices such as magnetic disk readers, optical disk readers and tape readers are generally more efficient when provided with some type of automated apparatus for inserting, removing and storing the disks or tapes. In some cases, elevator type devices such as are found in jukeboxes have been used to load and unload the disks or tapes. Unfortunately, the jukebox type device is designed to maximize capacity rather than efficiency. Thus, it is usually necessary to go through an entire sequence of selecting from storage, moving to a reader, loading into the reader, reading, unloading and moving back to storage before a different selection may be made. Additionally, a jukebox type changing device is usually large and complex with associated high cost. Thus in an environment where high data productivity and low cost are important, the elevator type device is inadequate.

One alternative to the elevator type device is disclosed in U.S. Pat. No. 4,271,489 to Siryj et al., Jun. 2, 1981, and U.S. Pat. No. 4,286,790, to Siryj et al., Sep. 1, 1981. In the Siryj patents, a magazine rack holds a plurality of optical disks in a vertical orientation. A changer, which travels parallel to the magazine rack, secures one disk from the magazine rack and transfers the disk to a reading position. The changer moves along a ball screw to the proper position for selecting a disk to be used from the stationary magazine. The changer secures the disk from the magazine and places it in a change position while travelling into alignment with the reader. The changer then inserts the disk into the reader which scans the data from the disk. Unfortunately, the Siryj device is complex with many moving parts and must be operated as a complete unit in conjunction with a special reader.

Another type of automatic changer is disclosed in U.S. Pat. No. 4,519,055 to Gilson, May 21, 1985. The Gilson device comprises a carousel type cartridge storage module. In the center of the module, a changer rotates to select any one of the cartridges for reading. After selecting and gripping a cartridge, the changer moves the cartridge, in conjunction with a carrier to a reader below the storage module for scanning. Thus the cartridges must be moved horizontally from a storage position to a changing position and then vertically from the changing position to a reading/scanning position. The Gilson device, like the Siryj device, is fairly complex and must generally be operated as a complete unit with an included reader. Thus there is a need for a method and apparatus that is simple in operation and may, if desired, be adapted for use with a variety of reading devices.

SUMMARY OF THE INVENTION

The present invention disclosed herein describes a method and apparatus for storing, moving and loading a plurality of optical storage disks which eliminates or substantially reduces problems associated with prior storing, moving and loading devices. The present invention allows the storing, moving and loading of optical storage disks with a relatively simple device constructed integrally with an optical reader or which may be added to an existing optical disk reader, if desired.

In accordance with one aspect of the invention, a magazine stores a plurality of optical storage disks each in a cartridge in a vertical and parallel orientation. The magazine comprises a removable container which may be transported as a separate unit having open front and rear ends for inserting and removing the cartridges. Linear slots are provided along a bottom of the container for receiving an upwardly protruding loading pin. The upwardly protruding pin is connected to a cartridge loading device which secures a single selected cartridge and inserts the cartridge into an optical storage disk reader.

The loading device comprises a lead screw which is motor driven by a belt. A follower nut to which the protruding pin is attached travels along the lead screw as the motor turns the lead screw. A channel is provided for the follower nut to travel within to prevent rotation thereof. At both ends of the lead screw, the follower nut fits into cutouts in the channel to allow the follower nut and the protruding pin to rotate out of contact with the cartridge. This rotation at one end allows insertion of the cartridges into the magazine as well as insertion of the magazine into a device for moving the magazine. At the other end, the rotation allows isolation of the reader from the loading device (the reader contains anti-shock devices, whereas the loading device does not).

The magazine hangs from a magazine carrier which is driven by a moving device. After the magazine is loaded into the carrier, a signal may be transmitted electrically to the moving device to move the carrier and thus the magazine in a direction perpendicular to the cartridge loading device. When the correct cartridge for loading is positioned over the loading device, the moving device stops the magazine carrier and the cartridge loading device is activated. The upwardly protruding pin on the follower nut is rotated into a slot in the optical storage disk cartridge, and, as the lead screw drives the follower nut therealong, the protruding pin takes the cartridge with it. After inserting the cartridge into the optical storage reader, the follower nut is turned aside to remove the protruding pin from the cartridge.

It is a technical advantage of the present invention that optical storage disk cartridges may be loaded in a vertical orientation into a reader without complex mechanisms such as an elevator. It is also a technical advantage of the present invention that a magazine containing a plurality of optical storage disk cartridges may be provided as an attachment to an existing optical storage disk reader.

It is a further advantage in that the present invention allows the use of a separate removable magazine which may be easily transported. The present invention is compact in design and compares favorably to a juke box device of similar capacity. It is a still further advantage of the present invention in that the magazine may be removed from the loading device for loading cartridges away from the optical reader. This provides the ability to use one magazine while another is removed for loading of different cartridges. The magazine may optionally be loaded while positioned in the magazine carrier.

BRIEF DESCRIPTION OF THE DRAWINGS

For a more complete understanding of the present invention and for further advantages thereof, reference is now made to the following Detailed Description taken in conjunction with the accompanying Drawings in which:

FIG. 3 is an end elevation along line 3—3 of FIG. 2;

FIG. 4 is a sectional view along line 4—4 of FIG. 2;

FIG. 5 is a sectional view along line 5—5 of FIG. 3;

FIG. 8 is an isometric view, partially cut-away, of the magazine and transporter mechanism of the present invention;

FIG. 10 is a top plan view of a portion of the magazine carrier;

FIG. 11 is a partial isometric view of the top slide of FIG. 10

FIG. 12 is a side elevation of the magazine ejection assembly with a magazine loaded; and FIG. 13 is a side elevation of the magazine ejection assembly with a magazine being ejected.

DETAILED DESCRIPTION OF THE INVENTION

Figure 1:
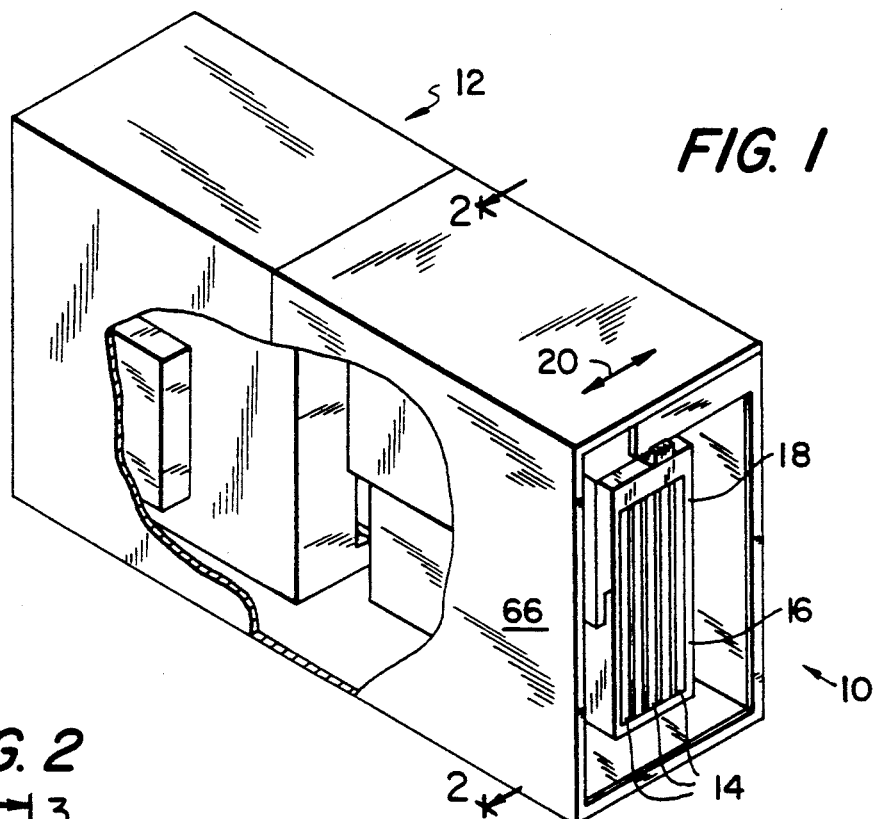
FIG. 1 is an isometric view of an optical disk reader incorporating the apparatus for storing, moving and loading optical storage disk cartridges in accordance with the preferred embodiment of the present invention.

In FIGS. 1-13, like items are identified by like and corresponding numerals for ease of reference. Referring first to FIG. 1, a mass loader constructed in accordance with the preferred embodiment of the present invention is generally identified by the reference numeral 10. The mass loader 10 may be fixed by any appropriate method to an optical storage disk reader generally identified by the reference numeral 12. The mass loader 10 allows the storing, moving and loading of a plurality of optical storage disk cartridges 14.

The optical storage reader 12 is preferably of the type which allows the simultaneous reading of both sides of an optical disk. By combining the mass loader 10 of the present invention with a dual side optical reader, it is possible to eliminate the need for a complex and bulky elevator. Although the preferred embodiment is described for use with a dual side reader, it is to be understood that use with other types of readers will still allow some of the advantages herein disclosed.

The cartridges 14 are stored in a magazine 16 in a parallel and vertical orientation with the magazine 16 depending from a magazine carrier 18. The magazine carrier 18 moves the magazine 16 in a direction indicated by an arrow 20, generally perpendicular to the parallel orientation of the cartridges 14, as will be subsequently described in greater detail.

The magazine 16 is positioned by the magazine carrier 18 to allow loading of the cartridge 14, into the optical disk reader 12. As will be subsequently described in greater detail, one of the cartridges 14 is selected by a cartridge loading apparatus 28 (FIG. 2) and inserted into the reader 12.

Figure 2:
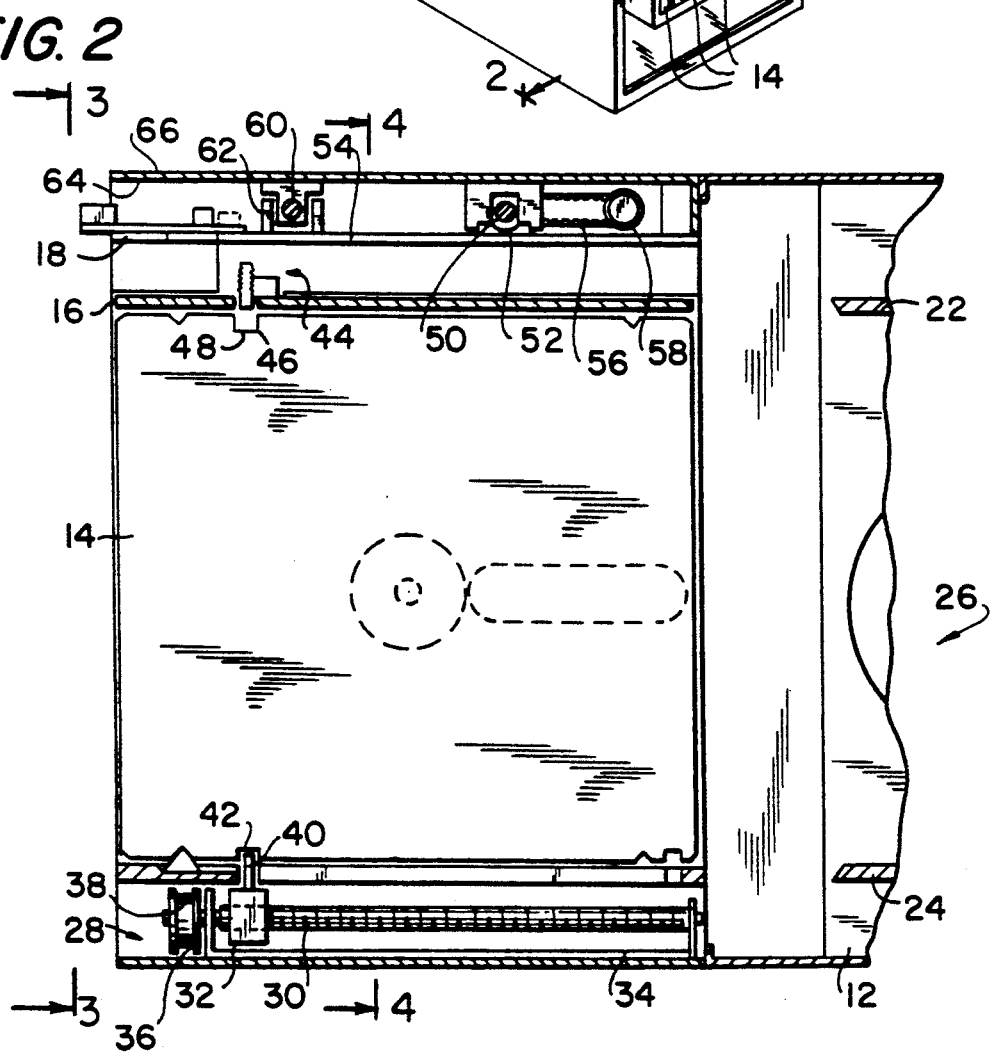
FIG. 2 is a sectional view along line 2—2 of FIG. 1.

Referring to FIG. 2, a cross-sectional view along the line 2—2 of FIG. 1 is shown. One of the cartridges 14 is shown in a load position properly aligned with the optical reader 12. The reader 12 may be provided with guide rails 22 and 24 to guide and hold the cartridge 14 within the reader 12. The reader 12 may also have a drive motor and spindle assembly which is generally indicated by the reference numeral 26. Upon insertion of the cartridge 14 into the reader 12, the drive motor and spindle assembly 26 provide rotational motion to a disk (not shown) within the cartridge 14 in order to obtain data therefrom.

The cartridge loading apparatus 28 is provided to load the selected cartridge 14 into the reader 12. The loading apparatus 28 comprises a first lead screw 30 and a follower nut 32. The lead screw 30 is supported by a bracket and channel assembly 34 (only shown partially in FIG. 2 for the sake of simplicity), as will be subsequently described in greater detail. The lead screw 30 is rotationally driven by any appropriate method, such as a drive pulley 36, a drive belt 38 and a motor 39 (FIG. 3).

To load the cartridge 14 into the reader 12, the magazine carrier 18 is positioned to place the selected cartridge 14 in the loading position. A loading pin 40 on the follower nut 32 is rotated into a slot 42 in the cartridge 14. The lead screw 30 then turns through the action of the motor 39, the belt 38 and the pulley 36 to drive the follower nut 32 therealong moving the cartridge 14 with the pin 40. After the cartridge 14 is loaded into the reader 12, the follower nut 32 is turned to allow the loading pin 40 to be rotated out of the slot 42 of the cartridge 14, as will be subsequently described in greater detail. After the optical reader 12 has obtained the required data on the disk within the cartridge 14, an unload sequence generally opposite the load sequence just described is initiated.

A cartridge retaining assembly generally identified by the reference numeral 44 is provided to hold the cartridges 14 within the magazine 16. As will be subsequently described in greater detail, the assembly 44 is biased toward the cartridge 14 to place a bar 46 within a slot 48 in the cartridge 14 directly opposite the slot 42 previously described (thus allowing the cartridges 14 to be loaded into the magazine 16 on either end thereof). As the magazine 16 is loaded into the magazine carrier 18, the bar 46 is removed from the slot 48 (by means not shown in FIG. 2) allowing the cartridges 14 to be inserted into and removed from the magazine 16.

The magazine carrier 18 is driven along a second lead screw 50 by a follower nut 52 which is fixed to a top surface 54 of the magazine carrier 18 by any appropriate method, such as welding. The lead screw 50 may be driven by any appropriate means such as a drive belt 56 and a motor 58. A guide bar 60 is provided to help balance and support the magazine carrier 18 during its movement by the action of the lead screw 50. The guide bar 60 travels through at least one pillow block 62 fixed to the top surface 54 of the carrier 18 and is supported by sidewalls of a case 66 (FIG. 1) which enclose the magazine carrier 18 and the magazine 16. To place a cartridge 14 into the loading position, the motor 58 drives the lead screw 50 causing the follower nut 52 and the magazine carrier 18 to travel therealong, thus moving the magazine 16 in the direction 20 (FIG. 1) perpendicular to the cartridges 14.

Referring to FIG. 3, an end elevation along the line 3—3 of FIG. 2 is shown in which the case 66 can be seen to enclose the magazine carrier 18 and the magazine 16. The guide bar 60, which is supported by the sidewalls of the case 66, helps guide the magazine carrier 18 during its travel. In the preferred embodiment, the guide bar 60 is interconnected to the magazine carrier 18 by two pillow blocks 62. The magazine 16 comprises a first sidewall 68, a second sidewall 70, a top 72 and a bottom 74. Protrusions 76 extend toward each other from the top 72 and the bottom 74 of the magazine 16 to form guide channels 78 therebetween for receiving and guiding the cartridges 14.

In operation, a plurality of cartridges 14 are loaded into the magazine 16 which may or may not yet be loaded into the magazine carrier 18. Each cartridge 14 is fit into one of the guide channels 78 and slidably inserted until the slot 48 is aligned with the bar 46 (FIG. 2). The cartridge retaining assembly 44 which was lifted to remove the bar 46 from obstructing the insertion of the cartridge 14 is released to insert the bar 46 into the slot 48. This sequence is repeated until as many of the channels 78 are filled as desired with cartridges 14 which are then retained within the magazine 16 by the bar 46. The magazine 16 is then loaded into the magazine carrier 18, as will be subsequently described in greater detail.

Referring to FIG. 4, a cross-sectional view along the line 4—4 of FIG. 2 is shown. The lead screw 50 which drives the magazine carrier 18 and the magazine 16 perpendicular to the cartridges 14 is rotationally attached at opposite ends thereof to the case 66. The drive motor 58 drives the belt 56, a drive pulley 80 and the lead screw 50 which causes the follower nut 52 to travel therealong. Since the follower nut 52 is fixed to the top surface 54 of the magazine carrier 18, the magazine carrier 18 travels therewith.

The follower nut 32 of the cartridge loading apparatus 28 is shown with the loading pin 40 inserted into an opening 82 which is centrally located between the protrusions 76 in the guide channels 78 to allow the follower nut 32 to pull a cartridge 14 therealong. The bracket and channel assembly 34 has a first sidewall 84 and a second sidewall 86 between which the follower nut 32 runs. As the lead screw 30 turns, the follower nut 32 runs therealong within the bracket and channel assembly 34 which prevents the follower nut 32 from turning aside.

As can also be seen from FIGS. 3 and 4, there is sufficient room between the sidewalls of the case 66 to allow the magazine 16 to move to place each of the cartridges 14 into the loading position directly over the lead screw 32 regardless of their position within the magazine 16. The motor 58 is therefore reversible to drive the magazine 16 and the magazine carrier 18 back-and-forth along the lead screw 50.

Referring to FIG. 5, a cross-sectional view along the line 5—5 of FIG. 3 is shown. The protrusions 76 run the length L of the magazine 16 to form the guide channels 78 therebetween. The first sidewall 68 and the second sidewall 70 of the magazine 16 form with the protrusions 76 the exterior most guide channels 78. The openings 82 are formed within the guide channels 78 between the protrusions 76 running the length thereof to allow removal and insertion of the cartridge 14 by the loading pin 40. Proximate the rear edge 88 of the magazine 16 there are a plurality of sensors 90 which provide data to a controller (not shown) indicating whether a cartridge 14 is present within the guide channels 78. Proximate the sensors 90 are retaining springs 92 which help keep the cartridges 14 within the magazine 16 without preventing insertion or removal thereof when the bar 46 is removed from the slots 48.

Figure 6:
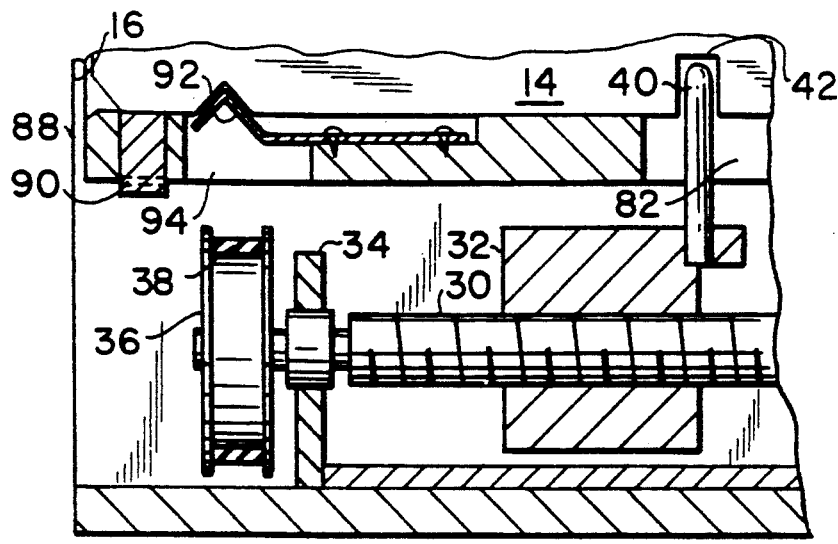
FIG. 6 is a partial sectional view along line 6—6 of FIG. 4.

Referring to FIG. 6, a partial cross-sectional view along the line 6—6 of FIG. 4 is shown with the cartridge 14 fully inserted into the magazine 16 and in the loading position. The slot 42 in the cartridge 14 is aligned with the loading pin 40 of the follower nut 32. The follower nut 32 is driven by the lead screw 30 which is supported by the bracket and channel assembly 34. The lead screw 30 is driven by the drive pulley 36 fixed to an end thereof which is in-turn driven by a drive belt 38. Thus, the cartridge 14 is in the load position with the loading pin 40 positioned to pull/push the cartridge 14 as the lead screw 30 drives the follower nut 32.

The sensor 90 and the retaining spring 92 are located on the rear edge 88 of the magazine 16. The spring 92 is constructed and arranged to provide a slight retaining force on the cartridge 14 which may be easily overcome by the lead screw 30. The sloped sides of the spring 92 allow the cartridge 14 to push the spring 92 into a recess 94 therebelow as the cartridge 14 moves in either direction.

Figure 7:
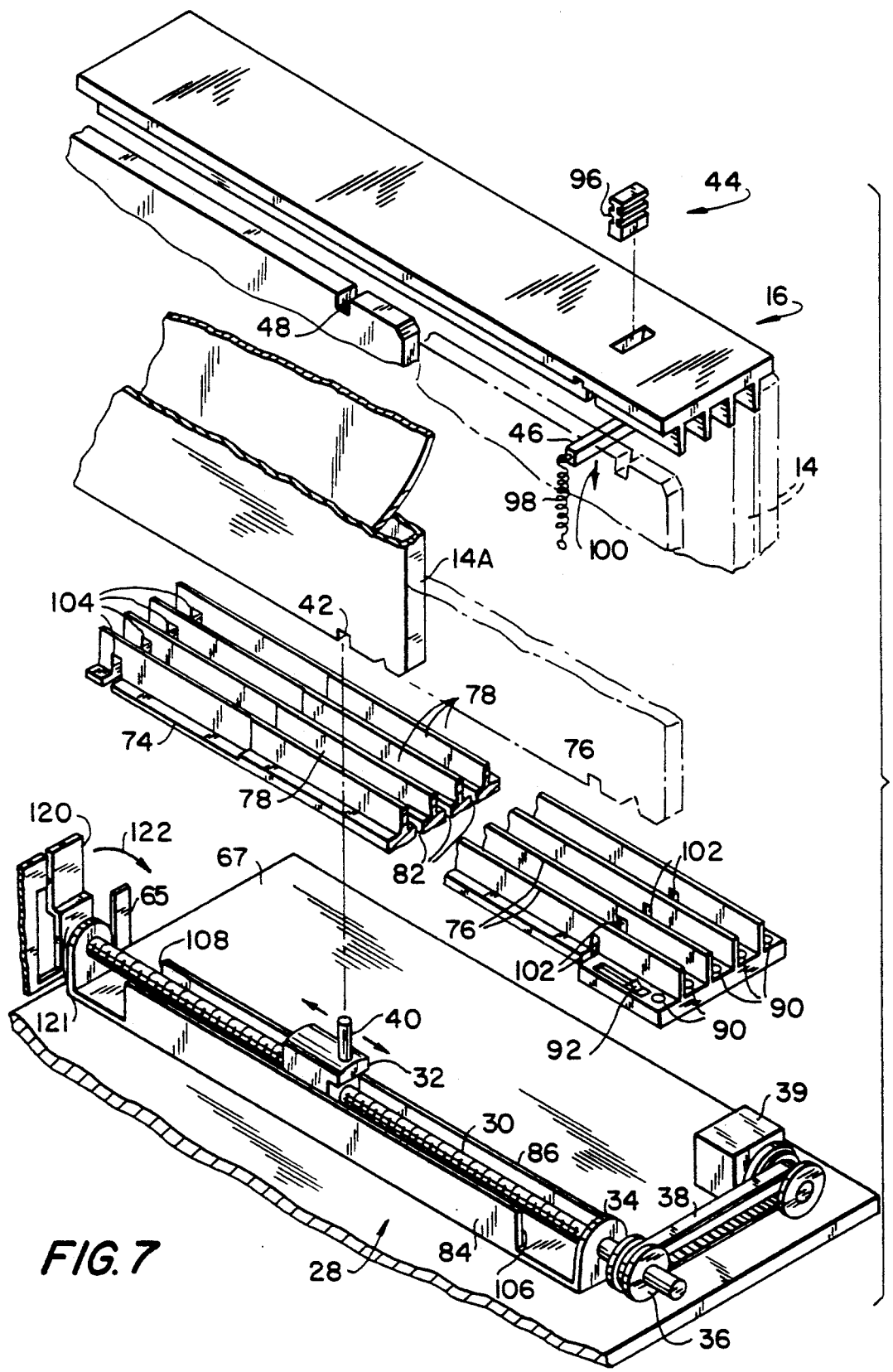
FIG. 7 is a partial exploded isometric view of the magazine of the present invention.

Referring to FIG. 7, a partially exploded isometric view of the magazine 16 and the cartridge loading apparatus 28 is illustrated. The cartridge retaining assembly 44 comprises a handle 96 fixed to the bar 46. A spring 98 is attached between each end of the bar 46 and a portion of the sidewalls 68 and 70 of the magazine 16 to bias the bar 46 in the direction of an arrow 100. Thus, when a cartridge 14 is inserted within the magazine 16, the bar 46 will normally secure the cartridge 14 therein.

The cartridges 14 are slidably received within the magazine 16 within the guide channels 78. The sensors 90 indicate whether a cartridge 14 is positioned within the magazine 16 and the retaining spring 92 assists in holding the cartridges 14 within the magazine 16 once loaded into the magazine carrier 18. A cutout 102 is formed through each protrusion 76 and the bottom 74 of the magazine 16 to allow passage of the loading pin 40 therethrough. Similarly, cutouts 104 are formed through the protrusions 76 distal the cutouts 102 to allow movement of the magazine 16 without interference from the pin 40 subsequent to loading a cartridge 14.

One of the cartridges 14, for example, cartridge 14A is shown as being partially moved from the storage position as shown in phantom lines. The pin 40 is within the slot 42 to pull/push the cartridge 14A as the follower nut 32 is driven along the lead screw 30.

The lead screw 30 is driven by the motor 39 through the pulley 36 by the belt 38. As the lead screw 30 is turned, the follower nut 32 is driven therealong. The bracket and channel assembly 34 has a first sidewall 84 and a second sidewall 86 within which the follower nut 32 travels. A notch 106 is formed in the first sidewall 84 proximate the pulley 36 to allow the follower nut 32 to be rotated out of contact with the magazine 16 to allow insertion thereof into the magazine carrier 18 as well as to allow insertion of individual cartridges 14 into the magazine 16. A notch 108 is similarly located at the opposite end of the assembly 34 in the second wall 86 to allow the follower nut 32 to rotate the pin 40 out of contact with the cartridge 14A after loading thereof into an optical reader 12, thus isolating the cartridge 14A from the mass loader 10.

A door 120 is rotatably attached by a friction clutch 121 to the end of the lead screw 30 distal the pulley 36. When the lead screw 30 is driven in a clockwise direction as indicated by an arrow 122, the door 120 is rotated 90° in the clockwise direction 122. Thus, during loading of the cartridge 14A, the door 120 is rotated away from its normal position blocking the entrance to the optical reader 12 as shown in FIG. 7. After removal of the cartridge 14A, the door 120 is allowed to rotate 90° in a counter-clockwise direction by the lead screw 30 to block the entrance to the optical reader 12. The door 120 prevents the accidental insertion of a cartridge 14 into the reader 12 when loading the magazine 16 while installed in the carrier 18.

The case 66 is provided with a lip (shown only partially at 65) projecting upwardly from the bottom 67 on an end distal the motor 39. The lip 65 may be formed by bending a portion of the bottom 67 upwardly to provide a stop for all but the center cartridge 14 in the magazine 16. A cut-out must be provided in the lip 65 to allow the cartridge 14 in the loading position to be loaded into the reader 12 with the door 120 providing a stop for the loading position cartridge 14 (unless the cartridge 14 is actually being loaded into the reader 12).

Referring to FIG. 8, the magazine 16 is positioned for insertion into the magazine carrier 18 which has a general U-shape. The follower nut 32 is rotated into the notch 106 to prevent the loading pin 40 from obstructing the insertion of the magazine 16. Rails 110 on the magazine 16 are placed into alignment with flanges 112 in the magazine carrier 18 to insert the magazine 16 therein. Guide wheels 114 are provided along the flanges 112 to support and allow movement of the magazine 16. As the magazine 16 is inserted into the carrier 18, the pins 116 which are extensions of the bar 46 of the cartridge retaining assembly 44 come into contact with a portion of a magazine ejection assembly generally identified by the reference numeral 118, as will be subsequently described in greater detail. The assembly 118 lifts the pins 116 against their downward bias to remove the bar 46 from the slot 48 in the cartridges 14. By removing the bar 46 from the slots 48, the follower nut 32 and loading pin 40 may propel the cartridges 14 into the optical reader 12.

Figure 9:
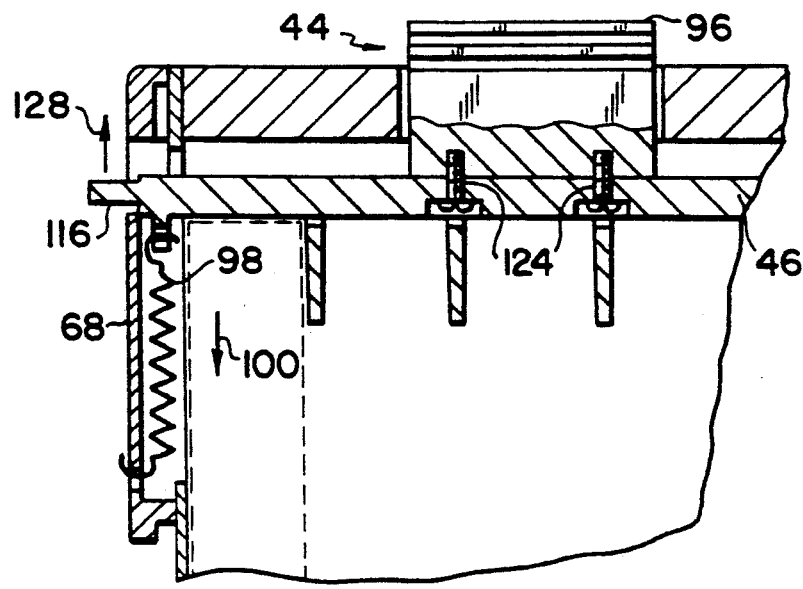
FIG. 9 is a sectional view along the line 9—9 of FIG. 8.

Referring to FIG. 9, a view of the assembly 44 along the line 9—9 of FIG. 8 is shown. The assembly 44 comprises the handle 96 fixed to the bar 46 by any appropriate method such as bolts 124. The pins 116 project through the sidewalls 68 and 70 (only 68 shown) of the magazine 16. The spring 98 normally biases the bar 46 downwardly as indicated by the arrow 100 in order to fit into the slots 48 in the cartridges 14. Upon engagement with a portion of the magazine ejection assembly 118, the pins 116 are pushed upwardly as indicated by an arrow 128 to release the cartridges 14 for loading into the reader 12.

Referring simultaneously to FIGS. 10, 11, 12 and 13, the magazine ejection assembly 118 is shown in greater detail. Referring first to FIG. 10, a top slide 130 is positioned on a top surface 132 of the magazine carrier 18. The top slide 130 preferably comprises a generally rigid, metallic substance and is formed with slots 134 therein. The slots 134 are slidably received by pins 136 which are fixed to the top surface 132. A handle 138 is provided to allow an operator to slide the top slide 130 in a direction indicated by an arrow 140 along the slots 134 from the normal position as shown in FIG. 10 to the position as shown in FIG. 11.

The normal position for the top slide 130 is maintained by a pair of spring biased pivot arms 142. The pivot arms 142 press against L-Shaped projections 144 on the top slide 130 due to a spring 146 (FIG. 11). When an operator pushes the handle 138 to slide the top slide 130 in the direction 140, the projections 144 force the pivot arms 142 to pivot against the bias of the spring 146 into the position as shown in FIG. 11.

Referring to FIGS. 12 and 13, the pivot arms 142 are shown in operation. FIG. 12 illustrates the normal spring biased position for the pivot arms 142 (only one of which is shown). In the normal position, the pivot arm 142 is in a generally vertical orientation about a pivot pin 153. A first arm 148 abuts and holds a spring loaded ejector 150 against slide pins 152 which are fixed to the carrier 18. A second arm 154 secures a magazine retaining pin 156 (see FIG. 8) by an extension 158 thereon.

The ejector 150 has slots 160 therein to allow sliding relative to the pins 152. The ejector 150 is biased in a direction indicated by arrow 162 by a tension spring 164 fixed between the carrier 18 and a protrusion 166 on the ejector 150. Due to the first arm 148 on the pivot arm 142, the ejector 150 is pushed against the bias of the spring 164 into the pins 152 as shown in FIG. 12.

An ejector flange 167 is formed on an end of the ejector 150 distal the arm 148. The flange 167 extends outwardly with reference to the plane of the paper to contact a front edge 168 of the magazine carrier 16 which would also extend outwardly from the plane of the paper.

A cutout 170 in the pivot arm 142 is provided to receive the pins 116 of the bar 46. A sloped portion 172 allows the pins 116 to slide into the cutout 170 which is arranged to hold the bar 46 out of the slots 48 in the cartridges 14 as previously described above. Thus, as the magazine 16 is loaded into the carrier 18, the pins 116 hit the sloped surface 172 and slide upwardly into the cutouts 170 to release the cartridges 14 for loading into the reader 12.

To eject the magazine 16, an operator pushes the handle 138 in the direction 140 (FIG. 13) to move the top slide 130 against the pivot arms 142. The L-Shaped projections 144 force the pivot arms 142 to pivot about their pivot pins 153 in a direction indicated by arrow 176. The pivoting of the arms 142 causes the first arms 148 to move away from and release the ejectors 150. The ejectors 150 are thus free to slide in the direction 162 along the slots 160 against the pins 152 due to the tension in the springs 164. Additionally, the pivoting of the arms 142 causes the second arms 154 to release the magazine retaining pins 156. Thus, as the ejectors 150 slide in the direction 162 and the ejector flanges 167 push against the front edge 168 of the magazine 16, the magazine 16 slides out of the carrier 18.

The ejector 150 remains in the spring biased position as shown in FIG. 13 until the magazine 16 is reloaded. During the reloading process, the front edges 168 of the magazine 16 push against the flanges 167 moving the ejectors 150 into the position as shown in FIG. 12. The movement of the ejectors 150 allows the pivot arms 142 to pivot about pins 153 due to the biasing of the springs 146 and lock the ejectors 150 by the first arms 148. The pivoting of the pivot arms 142 also catches the retaining pins 156 between the second arms 154 and the extensions 158 as shown in FIG. 12 to lock the magazine 16 in place. The pivoting of the arms 142 forces the top slide 130 into the position as shown in FIG. 12. As the magazine 16 approaches the fully inserted position, the pins 116 slide up the sloped portions 172 into the cutouts 170 to release the cartridges 14 from the arm 46. The mass loader 10 is thus loaded and ready to reposition as required for the loading of cartridges 14 into the reader 12.

In operation, at least one optical storage disk cartridge 14 is slid into the magazine 16. The cartridge 14 fits within the opening 82 between the protrusions 76 in the magazine 16. The cartridge retaining assembly 44 must be raised to allow each cartridge 14 to be fully inserted into the magazine 16 and then lowered to lock the cartridge 14 therein. The sensors 90 are provided in the magazine 16 to indicate whether a cartridge 14 is present therein.

The magazine 16 is then loaded into the carrier 18 by matching the rails 110 with the flanges 112. As the magazine is propelled into the carrier 18, the rails 110 easily ride on the guide wheels 114. The magazine 16 is firmly held in place by the second arm 154 and the magazine retaining pin 156. The bar 46 is removed from the slots 48 in the cartridges 14 due to the action of the pins 116 against the sloped portions 172 of the pivot arms 142.

The magazine carrier 18 moves along the second lead screw 50 to position the proper cartridge 14 for loading into the reader 12. To load the cartridge 14, the first lead screw 30 is driven by the motor 39. As the lead screw 30 turns, the follower nut 32 travels therealong. Due to the loading pin 40 which is fixed to the follower nut 32, a cartridge 14 is propelled into the reader 12.

Upon completion of the scanning of material stored within the cartridge 14, the follower nut 32 and loading pin 40 pull the cartridge 14 from the reader 12 back into the magazine 16. Based on an electrical signal from an external source, the magazine 16 can then be moved by the carrier 18 to place a different cartridge into the loading position over the lead screw 30.

Thus, the present invention provides a relatively simple device that allows the use of multiple disks without the need for an elevator. The magazine herein described is removable from the mass loader allowing easy transportability. Cartridges may be inserted into the magazine while the magazine is separated from the magazine carrier or while hanging therefrom. Thus, magazines may be easily replaced as units, thereby increasing operational flexibility of the optical storage disk reader.

Although the present invention has been described with respect to a specific preferred embodiment thereof, various changes and modifications may be suggested to one skilled in the art, and it is intended that the present invention encompass such changes and modifications as fall within the scope of the appended claims.

We claim:

1. An apparatus for storing, moving and loading a plurality of disk cartridges, comprising:

a magazine for storing said plurality of cartridges, comprising means for holding said cartridges in respective locations with a given orientation parallel to each other, means for moving said magazine in a direction transverse to said given orientation, and loading and unloading means for moving a selected one of said cartridges from its location in a direction parallel to said given orientation, characterized in that said loading and unloading means comprises a first lead screw having an axis extending in said direction, a first follower nut engaging said lead screw, means for limiting rotation of said nut about said axis, and means for rotating said lead screw about said axis in first and second opposite directions of rotation for moving said nut parallel to said axis between a loading and a loaded position, said means for limiting rotation comprises means for guiding said nut to be in approximately a given angular position about said axis while the nut is in positions between said loading and unloading positions, and means for permitting said nut to rotate about said axis to a first release position to one side of said given angular position when the nut is in said loading position, and to a second release position to the other side of said given angular position when the nut is in said loaded position, said nut further comprises means for engaging said selected cartridge while the nut is in said given angular position, and for being free from engagement with said cartridge while the nut is in either release position, said lead screw being threaded in such direction that, starting with the nut in said first release position, rotation of the lead screw in the first direction of rotation rotates the nut to the given angular position, then moves the nut axially to the loaded position, and then rotates the nut to the second release position; and rotation of the lead screw in the second direction of rotation rotates the nut from the second release position to said given angular position, then moves the nut to the loading position, and then rotates the nut to the first release position.

2. An apparatus as claimed in claim 1, characterized in that said means for guiding comprises two walls extending parallel to said led screw for engaging sides of said nut, and said means of permitting comprises a respective notch in each wall.

3. An apparatus as claimed in claim 1, wherein said cartridges are optical storage disk cartridges each containing a disk having a central axis, characterized in that said given orientation is a vertical orientation, and said magazine comprises means for aligning said plurality of cartridges with their central axes coaxial when said cartridges are in respective stored positions in said magazine, for loading a cartridge, said means for moving said magazine moves in a direction parallel to said central axes to dispose said selected one of said cartridges above said nut while said nut is in said first release position.

4. An apparatus for storing and moving a plurality of optical storage disk cartridges, and loading them into a optical disk scanner, comprising:

a magazine for storing said plurality of cartridges, comprising means for holding said cartridges in respective locations in a vertical orientation parallel to each other, means for moving said magazine in a direction transverse to said given orientation, and loading and unloading means for moving a selected one of said cartridges from its location in said magazine into said optical scanner, in a direction parallel to said vertical orientation, comprising a first lead screw having an axis extending in said direction, a first follower nut engaging said lead screw, means for limiting rotation of said nut about said axis, and means for rotating said lead screw about said axis in first and second opposite directions of rotation for moving said nut parallel to said axis between a loading and a loaded position, said means for limiting rotation comprising means for guiding said nut to be in approximately a given angular position about said axis while the nut is in positions between said loading and loaded positions, and means for permitting said nut to rotate about said axis to a first release position to one side of said given angular position when the nut is in said loading position, and to a second release position to the other side of said given angular position when the nut is in said loaded position, said nut further comprising means for engaging said selected cartridge while the nut is in said given angular position, and for being free from engagement with said cartridge while the nut is in either release position, and said lead screw being threaded in such direction that, starting with the nut in said first release position, rotation of the led screw in the first direction of rotation rotates the nut to the given angular position to engage said selected cartridge, then moves the nut axially to the loaded position thereby loading the cartridge into said optical scanner, and then rotates the nut to the second release position to release engagement of said cartridge; and rotation of the lead screw in the second direction of rotation rotates the nut from the second release position to said given angular position to engage said cartridge in the optical scanner, then moves the nut to the loading position to withdraw the cartridge from the optical scanner back into the magazine, and then rotates the nut to the first release position.

5. An apparatus as claimed in claim 4, characterized in that said means for guiding comprises two walls extending parallel to said lead screw for engaging sides of said nut, and said means for permitting comprises a respective notch in each wall.

6. An apparatus as claimed in claim 5, characterized in that said means for engaging comprises a pin extending radially outward from said nut, said cartridges have respective slots along lower edges thereof, and said magazine includes a respective slot below each cartridge extending parallel to said lead screw, and cutouts extending transversely of each respective slot, for permitting passage of said pin as the nut rotates from the release positions to the given angular position and is moved axially.

7. An apparatus as claimed in claim 4, characterized in that said means for engaging comprises a pin extending radially outward from said nut, said cartridges have respective slots along lower edges thereof, and said magazine includes a respective slot below each cartridge extending parallel to said lead screw, and cutouts extending transversely of each respective slot, for permitting passage of said pin as the nut rotates from the release positions to the given angular position and is moved axially.

* * * * *